US012586865B2

(12) United States Patent
Shin et al.

(10) Patent No.: US 12,586,865 B2
(45) Date of Patent: Mar. 24, 2026

(54) BATTERY MODULE, AND BATTERY PACK AND VEHICLE COMPRISING THE SAME

(71) Applicant: LG ENERGY SOLUTION, LTD., Seoul (KR)

(72) Inventors: Ju-Hwan Shin, Daejeon (KR);
Dong-Hyun Kim, Daejeon (KR);
Tae-Geun Kim, Daejeon (KR);
Jong-Hwa Choi, Daejeon (KR);
Hyoung-Suk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 519 days.

(21) Appl. No.: 18/024,292

(22) PCT Filed: Jun. 14, 2022

(86) PCT No.: PCT/KR2022/008410
§ 371 (c)(1),
(2) Date: Mar. 2, 2023

(87) PCT Pub. No.: WO2022/265360
PCT Pub. Date: Dec. 22, 2022

(65) Prior Publication Data
US 2023/0318130 A1 Oct. 5, 2023

(30) Foreign Application Priority Data
Jun. 17, 2021 (KR) ........................ 10-2021-0078997

(51) Int. Cl.
*H01M 50/383* (2021.01)
*H01M 50/211* (2021.01)
*H01M 50/367* (2021.01)

(52) U.S. Cl.
CPC ....... *H01M 50/383* (2021.01); *H01M 50/211* (2021.01); *H01M 50/367* (2021.01)

(58) Field of Classification Search
None
See application file for complete search history.

(56) References Cited

U.S. PATENT DOCUMENTS 8,956,747 B2 2/2015 Itoi et al.
9,012,063 B2 4/2015 Kim
(Continued)

FOREIGN PATENT DOCUMENTS

CN 211629200 U 10/2020
EP 4 199 226 A1 6/2023
(Continued)

OTHER PUBLICATIONS

Extended European Search Report for European Application No. 22825285.4, dated Apr. 29, 2024.
(Continued)

*Primary Examiner* — Wyatt P Mcconnell
(74) *Attorney, Agent, or Firm* — Birch, Stewart, Kolasch & Birch, LLP

(57) ABSTRACT

A battery module includes a plurality of battery cells having electrode leads on at least one side; a module housing having an accommodation space in which the plurality of battery cells is received, the module housing including an exit port on the at least one side having the electrode leads of the plurality of battery cells, the exit port through gas vented from the plurality of battery cells exits; and a gas venting member configured to cover at least one side of the module housing, the gas venting member having a passage along which the gas coming out of the exit port moves.

13 Claims, 15 Drawing Sheets

(56) References Cited

U.S. PATENT DOCUMENTS

| | | | |
|---|---|---|---|
| 9,159,970 B2 * | 10/2015 | Watanabe .......... | H01M 10/613 |
| 10,381,622 B2 | 8/2019 | Kim et al. | |
| 10,446,813 B2 | 10/2019 | Kim et al. | |
| 2011/0200856 A1 | 8/2011 | Yasui et al. | |
| 2011/0318618 A1 | 12/2011 | Yajima et al. | |
| 2012/0082875 A1 | 4/2012 | Watanabe et al. | |
| 2012/0261206 A1 | 10/2012 | Yasui et al. | |
| 2018/0108892 A1 | 4/2018 | Kim et al. | |
| 2019/0173074 A1 | 6/2019 | Ogawa et al. | |
| 2020/0067045 A1 | 2/2020 | Takano et al. | |
| 2020/0136110 A1 | 4/2020 | Koutari et al. | |
| 2021/0226268 A1 | 7/2021 | Egashira et al. | |
| 2022/0077539 A1 | 3/2022 | Ren et al. | |

FOREIGN PATENT DOCUMENTS

| | | |
|---|---|---|
| JP | 2006-294336 A | 10/2006 |
| JP | 2011-70871 A | 4/2011 |
| JP | 5466906 B2 | 4/2014 |
| JP | 5594592 B2 | 9/2014 |
| JP | 2015-133266 A | 7/2015 |
| JP | 2015-135763 A | 7/2015 |
| JP | 2018-73561 A | 5/2018 |
| JP | 2018-527704 A | 9/2018 |
| JP | 2019-102421 A | 6/2019 |
| KR | 10-2011-0140070 A | 12/2011 |
| KR | 10-2012-0034027 A | 4/2012 |
| KR | 10-1252950 B1 | 4/2013 |
| KR | 10-2030726 B1 | 10/2019 |
| KR | 10-2033101 B1 | 10/2019 |
| WO | WO 2011/007534 A1 | 1/2011 |
| WO | WO 2012/073439 A1 | 6/2012 |
| WO | WO 2018/123573 A1 | 7/2018 |
| WO | WO 2018/225609 A1 | 12/2018 |
| WO | WO 2020/003802 A1 | 1/2020 |
| WO | WO 2020/134070 A1 | 7/2020 |

OTHER PUBLICATIONS

International Search Report for PCT/KR2022/008410 (PCT/ISA/210) mailed on Sep. 15, 2022.

* cited by examiner

FIG. 6

BATTERY MODULE, AND BATTERY PACK AND VEHICLE COMPRISING THE SAME

TECHNICAL FIELD

The present disclosure relates to a battery module, and a battery pack and a vehicle comprising the same, and more particularly, to a battery module with improved safety against fires or gas explosions, and a battery pack and a vehicle comprising the same.

The present application claims the benefit of Korean Patent Application No. 10-2021-0078997 filed on Jun. 17, 2021 with the Korean Intellectual Property Office, the disclosure of which is incorporated herein by reference in its entirety.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

The lithium secondary battery usually uses a lithium-based oxide and a carbon material for a positive electrode active material and a negative electrode active material, respectively. Additionally, the lithium secondary battery includes an electrode assembly including a positive electrode plate and a negative electrode plate coated with the positive electrode active material and the negative electrode active material, respectively, with a separator interposed between the positive electrode plate and the negative electrode plate, and a packaging or a battery case in which the electrode assembly is hermetically received together with an electrolyte solution.

The lithium secondary batteries may be classified into can-type and pouch-type according to the shape of the battery case. The can-type secondary battery includes an electrode assembly embedded in a metal can, and the pouch-type secondary battery includes an electrode assembly embedded in a pouch of an aluminum laminate sheet.

More recently, there is a growing demand for high capacity battery packs used in electric vehicles. The high capacity battery pack includes a plurality of battery modules, each including secondary battery cells. In the high capacity battery packs mounted in electric vehicles, gas explosion may occur in any of the plurality of battery modules during the charge/discharge of the battery modules. In this instance, high temperature gas, flame or spark vented from the battery module moves to adjacent other battery module, causing thermal runaway of the other battery module or secondary gas explosion. Accordingly, the gas explosion leads to explosion propagation, and the scale and danger of the accident increases.

Therefore, there is a need for an approach to minimize the movement of gas to adjacent other battery module when gas explosion occurs in any of the plurality of battery modules.

In addition, since the high capacity battery module includes the plurality of battery cells, when gas explosion or thermal runaway occurs in any of the battery cells, the thermal runaway or fire spreads due to the transfer of high temperature gas, spark (particle) and flame to other battery cells in the battery module.

In this circumstance, there is a need for an approach to minimize the spread of thermal runaway or fire between battery cells received in one battery module.

DISCLOSURE

Technical Problem

The present disclosure is designed to solve the above-described problem, and therefore the present disclosure is directed to providing a battery module with improved safety against fires or gas explosions, and a battery pack and a vehicle comprising the same.

These and other objectives and advantages of the present disclosure can be understood by the following description, and will be apparent from the embodiments of the present disclosure. In addition, it will be readily appreciated that the objectives and advantages of the present disclosure can be realized by the means set forth in the appended claims and a combination thereof.

Technical Solution

To achieve the above-described objective, a battery module according to the present disclosure includes a plurality of battery cells, each battery cell of the plurality of battery cells having an electrode lead on at least one side; a module housing having an accommodation space in which the plurality of battery cells is received, the module housing including an exit port on the at least one side having the electrode leads of the plurality of battery cells, the exit port venting gas from the plurality of battery cells exits; and a gas venting member configured to cover at least one side of the module housing, the gas venting member having at least one gas channel along which the gas coming out of the exit port moves.

Additionally, the plurality of battery cells may be stacked in a first direction to form at least one battery cell group, the gas venting member may include a gas inlet through which the gas coming out of the exit port enters; and a gas outlet in communication with the gas channel and formed at an end of a movement direction of the gas in the gas channel, the gas outlet being open to allow the gas out, wherein the at least one gas channel has a plurality of passages along which the gas entering the gas inlet moves, and the exit port may be on the at least one side where the electrode leads of the battery cell group are disposed.

Additionally, the at least one gas channel may include at least two gas channels, and the at least two gas channels may be designed to allow the gas entering the at least two gas channels to move in different directions.

Additionally, wherein the at least one battery cell group comprises a first cell group and a second cell group with a first space between the first cell group and the second cell group, and a first gas channel of the at least two gas channels may extend from the first space in a direction away from the first space, and second gas channel of the at least two gas channels may extend from a side spaced from the first space toward the first space.

Furthermore, the gas venting member may include at least two gas outlets, and ene a first gas outlet of the at least two gas outlets may be at the side spaced from the first space, and a second gas outlet of the at least two gas outlets may be at the first space.

In addition, the at least one battery cell group may include a first cell group and a second cell group with a first space between the first cell group and the second cell group, and the battery module may further include a reinforcement beam mounted in an internal space of the module housing and disposed between the first cell group and the second cell group, the reinforcement beam including a partition configured to guide the movement of the gas vented from the plurality of battery cells to the exit port and separate the first cell group and the second cell group.

Further, the reinforcement beam may have a through-hole to allow air to move between the first cell group and the second cell group, and the reinforcement beam may further include an opening/closing member configured to close the through-hole when the gas is vented from the plurality of battery cells.

Additionally, the at least one gas channel may have a plurality of protrusions arranged at a predetermined interval to cause interference with the gas moving in the at least one gas channel.

Moreover, to achieve the above-described objective, a battery pack of the present disclosure includes at least one battery module.

Further, to achieve the above-described objective, a vehicle of the present disclosure includes at least one battery module.

The plurality of battery cells may form a first cell group and a second cell group, each of the first cell group and the second cell group having a first side and second side, the exit port of the module housing may include a first exit port at the first side and a second exit port at second side of each of the first cell group and the second cell group.

The gas venting member may have an inlet aligned with each exit port of the module housing and an outlet spaced from the inlet.

The plurality of battery cells has a first side and a second side spaced from the first side in a first direction, wherein the exit port of the module housing may include a first exit port at the first side of the plurality of battery cells and a second exit port at the first side of the plurality of battery cells, and the gas venting member may include a first gas inlet aligned with the first exit port, a first gas outlet spaced from the first gas inlet in the first direction, a first gas passage extending from the first gas inlet to the first gas outlet, a second gas inlet aligned with the second exit port, a second gas outlet spaced from the second gas inlet in the first direction, a second gas passage extending from the second gas inlet to the second gas outlet.

Advantageous Effects

According to an aspect of the present disclosure, since the battery module of the present disclosure includes the module housing having at least one exit port on at least one side of the plurality of battery cells, the exit port through which gas vented from the plurality of battery cells exits and the gas venting member configured to move the gas coming out of the exit port, it is possible to guide the movement of gas or high temperature spark to a location (i.e., the intended location) far away from adjacent other battery module, thereby effectively reducing the movement of the high temperature gas to the adjacent other battery module when the plurality of battery modules is mounted in the battery pack.

Additionally, according to an aspect of the present disclosure, when gas exits through at least one side having the electrode leads of the plurality of battery cells in the event of abnormal behaviors in any of the plurality of battery cells, the battery module of the present disclosure may allow the gas to exit the module housing at the shortest distance through the outlet on the at least one side having the electrode leads of the plurality of battery cells, thereby minimizing thermal runaway of the other battery cell or gas explosion propagation caused by the movement of the high temperature gas to the other battery cells in normal operation. Accordingly, the present disclosure may increase the safety against thermal runaway of the battery cell or gas explosion propagation.

Furthermore, since the present disclosure includes the gas venting member configured to cover at least one side of the module housing to increase the mechanical strength of the module housing, it is possible to safely protect the plurality of battery cells received in the module housing from external impacts when the external impacts are applied to the battery module.

DESCRIPTION OF DRAWINGS

The accompanying drawings illustrate the exemplary embodiment of the present disclosure and, together with the following detailed description, serve to provide a further understanding of the technical aspects of the present disclosure. However, the present disclosure should not be construed as being limited to the drawings.

FIG. 6 is a partial vertical cross-sectional view schematically showing the internal parts of a battery module according to an embodiment of the present disclosure.

BEST MODE

Figure 1:
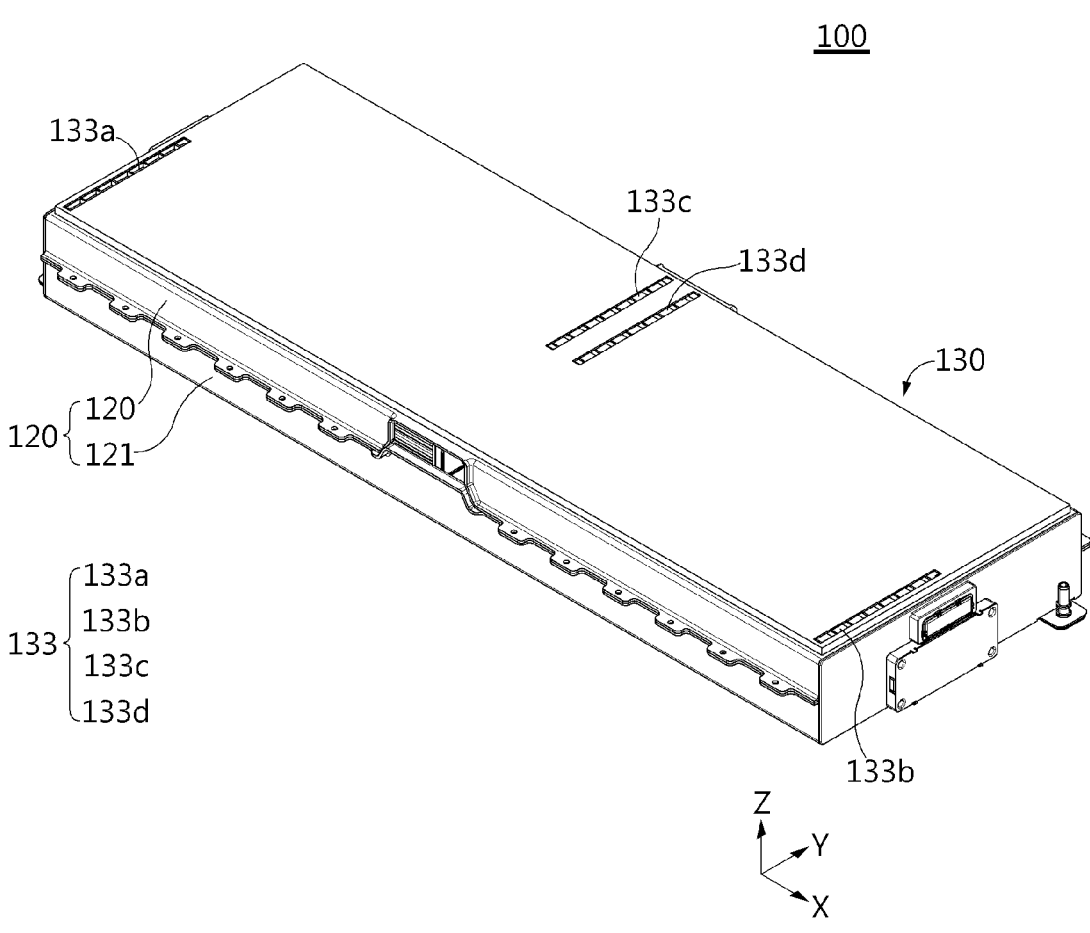
FIG. 1 is a perspective view schematically showing a battery module according to an embodiment of the present disclosure.

Hereinafter, the exemplary embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just an exemplary embodiment of the present disclosure, but not intended to fully describe the technical aspects of the present disclosure, so it should be understood that a variety of other equivalents and modifications could have been made thereto at the time that the application was filed.

Figure 2:
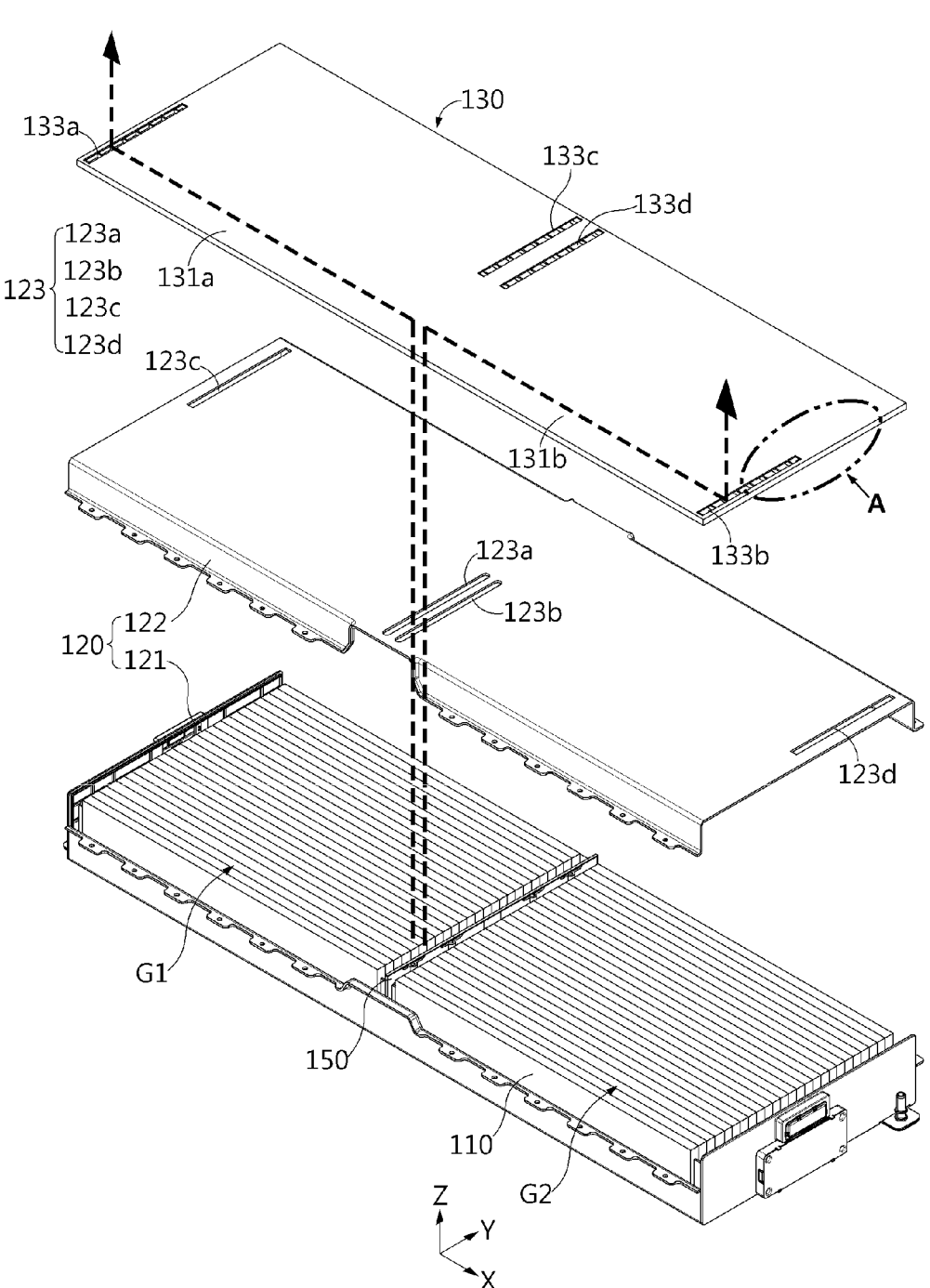
FIGS. 2 and 3 are exploded perspective views schematically showing the components of a battery module according to an embodiment of the present disclosure.
Figure 3:
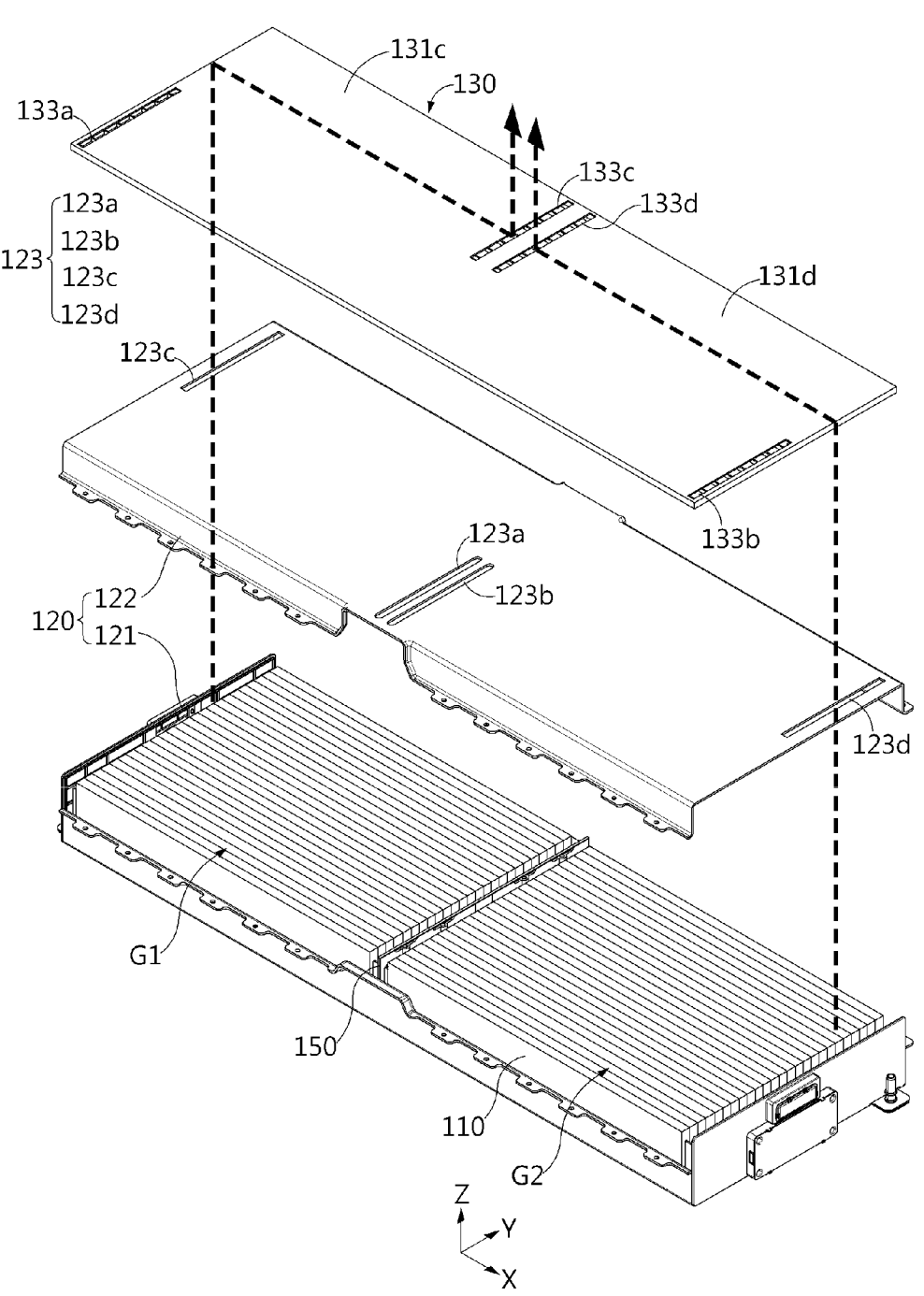
Figure 4:
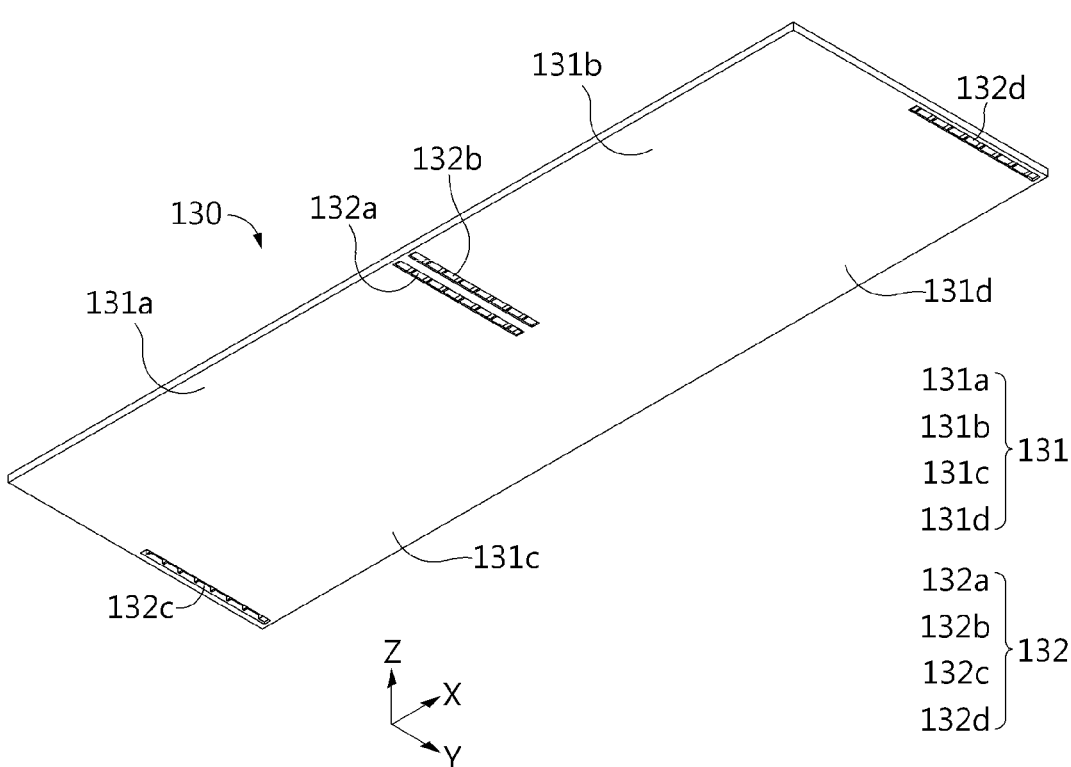
FIG. 4 is a bottom perspective view schematically showing a gas venting member of a battery module according to an embodiment of the present disclosure.

FIG. 1 is a perspective view schematically showing a battery module according to an embodiment of the present disclosure. FIGS. 2 and 3 are exploded perspective views schematically showing the components of the battery module according to an embodiment of the present disclosure. Additionally, FIG. 4 is a bottom perspective view schematically showing a gas venting member of the battery module according to an embodiment of the present disclosure. For reference, in FIG. 1, the X axis direction is a right direction, the Y axis direction is a backward direction and the Z axis direction is an upward direction.

Referring to FIGS. 1 to 4, the battery module 100 according to an embodiment of the present disclosure includes a plurality of battery cells 110, a module housing 120 and a gas venting member 130. Here, the battery cell 110 may include, for example, a pouch-type battery cell 110 which has high energy density and is easy to stack. As shown in FIG. 2, the pouch-type battery cells 110 may be stacked in the front-rear direction (Y axis direction) upright in the up-down direction (Z axis direction) to form a battery cell group G1. The battery cell 110 may have electrode leads 111 at each of two ends in the left-right direction. However, as opposed to this embodiment, the battery cell 110 of the present disclosure is not limited to the pouch-type battery cell and may include a prismatic battery cell 110 of a rectangular prism shape or a cylindrical battery cell 110.

Additionally, although not shown in the drawing, the battery cell group G1 may be electrically connected by a busbar including an electrically conductive metal. The busbar may have a metal rod or metal plate shape. The busbar may include a well-known commonly used connection member configured to electrically connect the plurality of battery cells 110. Its detailed description is omitted in the present disclosure.

Additionally, the module housing 120 is a component used to accommodate the plurality of battery cells 110 and may be formed with a hermetic structure using a material having high mechanical strength to protect the plurality of battery cells 110 from external mechanical and chemical factors. For example, as shown in FIG. 2, the module housing 120 may include an upper housing 122 and a lower housing 121. The lower housing 121 may be configured to cover the lower parts of the battery cells 110. The upper housing 122 may be configured to cover the upper parts of the battery cells 110. The upper housing 122 and the lower housing 121 may be approximately in the shape of a U-shaped plate. The lower edge area of the upper housing 122 and the upper edge area of the lower housing 121 may be coupled to each other by bolting and/or welding.

Furthermore, the module housing 120 is a component used to accommodate the plurality of battery cells 110 and may be formed with a hermetic structure using a material having high mechanical strength to protect the plurality of battery cells 110 from external mechanical and chemical factors. The module housing 120 may be configured to accommodate the plurality of battery cells 110 therein. The module housing 120 may have a hollow accommodation space. The module housing 120 may include at least one exit port 123 through which gas vented from the plurality of battery cells 110 exits. The exit port 123 may be on at least one side with respect to the plurality of battery cells 110. That is, the exit port 123 may be disposed on at least one side having the electrode leads 111 of the plurality of battery cells 110. In other words, the exit port 123 may be in communication with a space on one side of the plurality of battery cells 110.

For example, as shown in FIG. 2, the plurality of battery cells 110 may be stacked in the front-rear direction to form the battery cell group G1. The exit port 123 of the module housing 120 may be in communication with the space on each of the left side and the right side of the battery cell group G1. For example, as shown in FIG. 2, the exit port 123 of the module housing 120 may include a first exit port 123*a*, a second exit port 123*b*, a third exit port 123*c* and a fourth exit port 123*d*. When the battery module 100 includes two battery cell groups G1 arranged at an interval in the left-right direction, the module housing 120 may include the exit port 123 on at least one of one side or the other side of the battery cell group G1. For example, as shown in FIG. 2, the four exit ports 123*a*, 123*b*, 123*c*, 123*d* may be disposed on one side and the other side of each of the battery cell groups G1, G2. That is, the first exit port 123*a* and the second exit port 123*b* may be at the center of the left-right direction of the upper surface of the module housing 120. The third exit port 123*c* may be at the left end of the upper surface of the module housing 120, and the fourth exit port 123*d* may be at the right end of the upper surface of the module housing 120. In other words, the first exit port 123*a* may be disposed on the right side having the electrode leads of the battery cell group G1, the second exit port 123*b* may be disposed on the left side having the electrode leads of the battery cell group G2, the third exit port 123*c* may be disposed on the right side having the electrode leads of the battery cell group G1, and the fourth exit port 123*d* may be disposed on the left side having the electrode leads of the battery cell group G2.

Additionally, the gas venting member 130 may be configured to cover at least one side of the module housing 120. For example, the gas venting member 130 may include a metal having high mechanical strength. For example, as shown in FIG. 1, the gas venting member 130 may be disposed on the module housing 120. The gas venting member 130 may have a size corresponding to the upper surface of the module housing 120. That is, the gas venting member 130 may have a sufficient plane surface size to cover one surface of the module housing 120.

Further, the gas venting member 130 may guide the movement of gas coming out of the exit port 123 of the module housing 120 in the intended direction. Additionally, the gas venting member 130 may have a passage (not shown) along which the gas coming out of the exit port 123 moves. That is, the gas venting member 130 may move the generated gas to a location for minimizing damage induced by the gas through the internal passage.

Accordingly, according to this configuration of the present disclosure, when gas exits through at least one side having the electrode leads 111 of the plurality of battery cells 110 in the event of abnormal behaviors in any of the plurality of battery cells 110, the battery module 100 of the present disclosure may allow the gas to exit the module housing 120 at the shortest distance through the exit port 123 on the at least one side having the electrode leads 111 of the plurality of battery cells 110, thereby minimizing thermal runaway of the other battery cell 110 or gas explosion propagation caused by the movement of the high temperature gas to the other battery cells 110 in normal operation. Accordingly, the present disclosure may increase the safety against thermal runaway of the battery cell 110 or gas explosion propagation.

Furthermore, since the present disclosure includes the gas venting member 130 configured to cover at least one side of the module housing 120 to increase the mechanical strength of the module housing 120, it is possible to safely protect the plurality of battery cells 110 received in the module housing 120 from external impacts when the external impacts are applied to the battery module 100.

Figure 5:
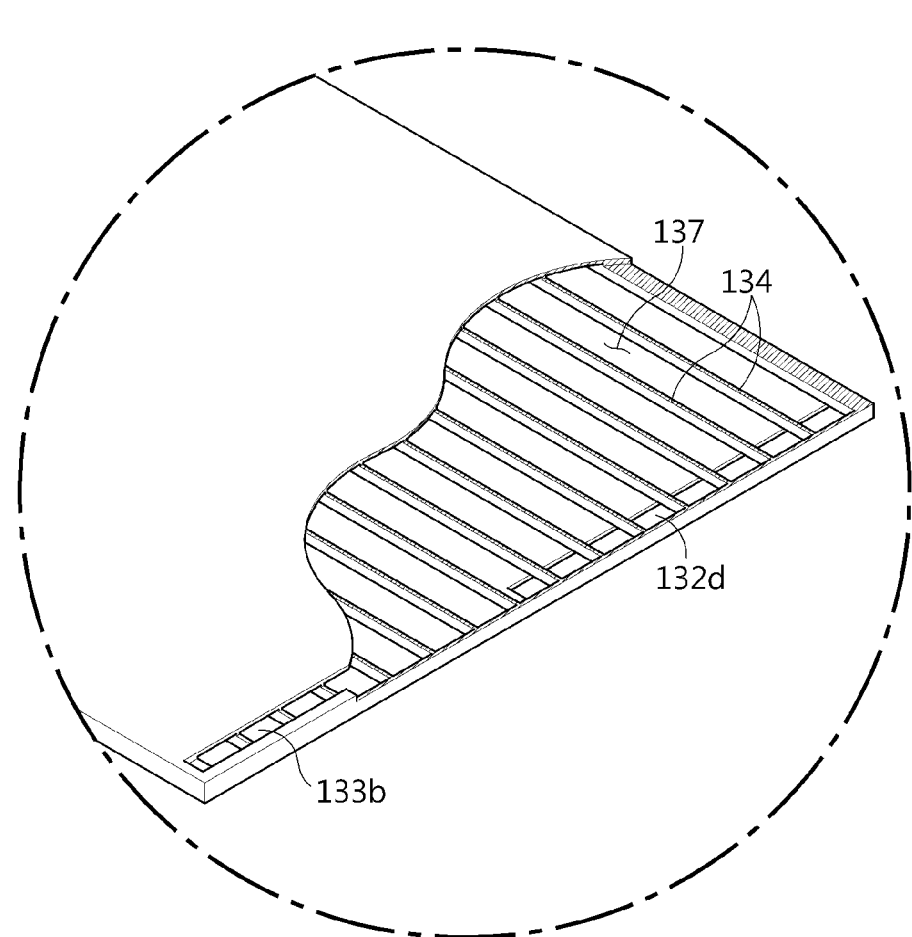
FIG. 5 is a partial cutaway perspective view schematically showing a gas venting member in section A of FIG. 2.

FIG. 5 is a partial cutaway perspective view schematically showing the gas venting member in section A of FIG. 2.

Referring to FIGS. 1 to 5, the gas venting member 130 may include a gas inlet 132, a gas channel 131 and a gas outlet 133. Specifically, the gas inlet 132 may be an open portion of the gas venting member 130 through which the gas coming out of the exit port 123 enters. The gas inlet 132 may be in communication with the exit port 123 of the module housing 120. That is, the gas inlet 132 may be at a location facing the exit port 123. For example, as shown in FIG. 4, when the exit port 123 is on the upper surface of the module housing 120, the gas inlet 132 may be on the lower surface of the gas venting member 130 at the location facing the exit port 123. The gas venting member 130 may include a first gas inlet 132*a*, a second gas inlet 132*b*, a third gas inlet 132*c* and a fourth gas inlet 132*d*. The first gas inlet 132*a* and the second gas inlet 132*b* may be disposed at the center of the left-right direction of the lower surface of the gas venting member 130. The third gas inlet 132*c* may be at the left end of the lower surface of the gas venting member 130. The fourth gas inlet 132*d* may be at the right end of the lower surface of the gas venting member 130.

The gas inlet 132 may have an opening that is extended in the front-rear direction. Additionally, the gas inlet 132 may be extended from the front end of the lower surface of the gas venting member 130 to the center of the front-rear direction. Alternatively, the gas inlet 132 may be extended from the rear end of the lower surface of the gas venting member 130 to the center of the front-rear direction. For example, as shown in FIG. 4, the first gas inlet 132*a* and the second gas inlet 132*b* may have an opening that is extended from the front end of the lower surface of the gas venting member 130 to the center of the front-rear direction. The third gas inlet 132*c* and the fourth gas inlet 132*d* may have an opening that is extended from the rear end of the lower surface of the gas venting member 130 to the center of the front-rear direction.

Additionally, the gas channel 131 may be a region having a passage along which the gas entering through the gas inlet 132 moves. The gas channel 131 may have multiple hollow structures. The length and width of the gas channel 131 may correspond to the length and width of the upper surface of the upper housing 122. The gas channel 131 may be hollow and include the passage 137 along which the gas moves. Additionally, the gas channel 131 may include a plurality of barriers 134 spaced apart from each other in the widthwise direction and extended in the lengthwise direction to divide the internal space. The gas channel 131 may reduce the temperature or the scale of flame by the dissipation of energy during the movement of high temperature gas, spark and flame entering through the gas inlet 132 along the narrow passage 137. As shown in FIGS. 2 and 3, the gas venting member 130 may include a first gas channel 131*a* and a second gas channel 131*b*.

As shown in FIG. 5, the gas channel 131 is divided by the barriers 134 and has the narrow passages 137 between the barriers 134. The plurality of narrow passages 137 may effectively increase the gas movement speed. Additionally, the narrow passages 137 may effectively regulate the movement of high temperature spark or flame. Additionally, the narrow passages 137 or the gas inlet 132 may have a metal mesh (not shown) to additionally regulate the movement of high temperature spark or flame.

Further, the gas outlet 133 may be in communication with the gas channel 131. The gas outlet 133 may be at the end of the narrow passage of the gas channel 131. The gas outlet 133 may be an open portion of the gas venting member 130. That is, the gas outlet 133 may be an opening at the end of the gas channel 131. For example, the gas outlet 133 may be disposed on one side of the battery cell group G1. For example, as shown in FIG. 2, the gas venting member 130 may include a first gas outlet 133*a*, a second gas outlet 133*b*, a third gas outlet 133*c* and a fourth gas outlet 133*d*. The first gas outlet 133*a* may be at the left end of the upper surface of the gas venting member 130. The second gas outlet 133*b* may be at the right end of the upper surface of the gas venting member 130. The third gas outlet 133*c* and the fourth gas outlet 133*d* may be disposed at the center of the left-right direction of the upper surface of the gas venting member 130. The third gas outlet 133*c* and the fourth gas outlet 133*d* may be spaced a predetermined distance apart from each other in the left-right direction.

Accordingly, according to this configuration of the present disclosure, since the present disclosure includes the module housing 120 having at least one exit port 123 on at least one side of the plurality of battery cells 110, the exit port 123 through which the gas vented from the plurality of battery cells 110 exits, and the gas venting member 130 configured to move the gas coming out of the exit port 123, it is possible to guide the movement of gas or high temperature spark to a location (i.e., the intended location) far away from adjacent other battery module 100, thereby effectively reducing the movement of the high temperature gas to the adjacent other battery module 100 when the plurality of battery modules 100 is mounted in the battery pack 1000.

Figure 6:
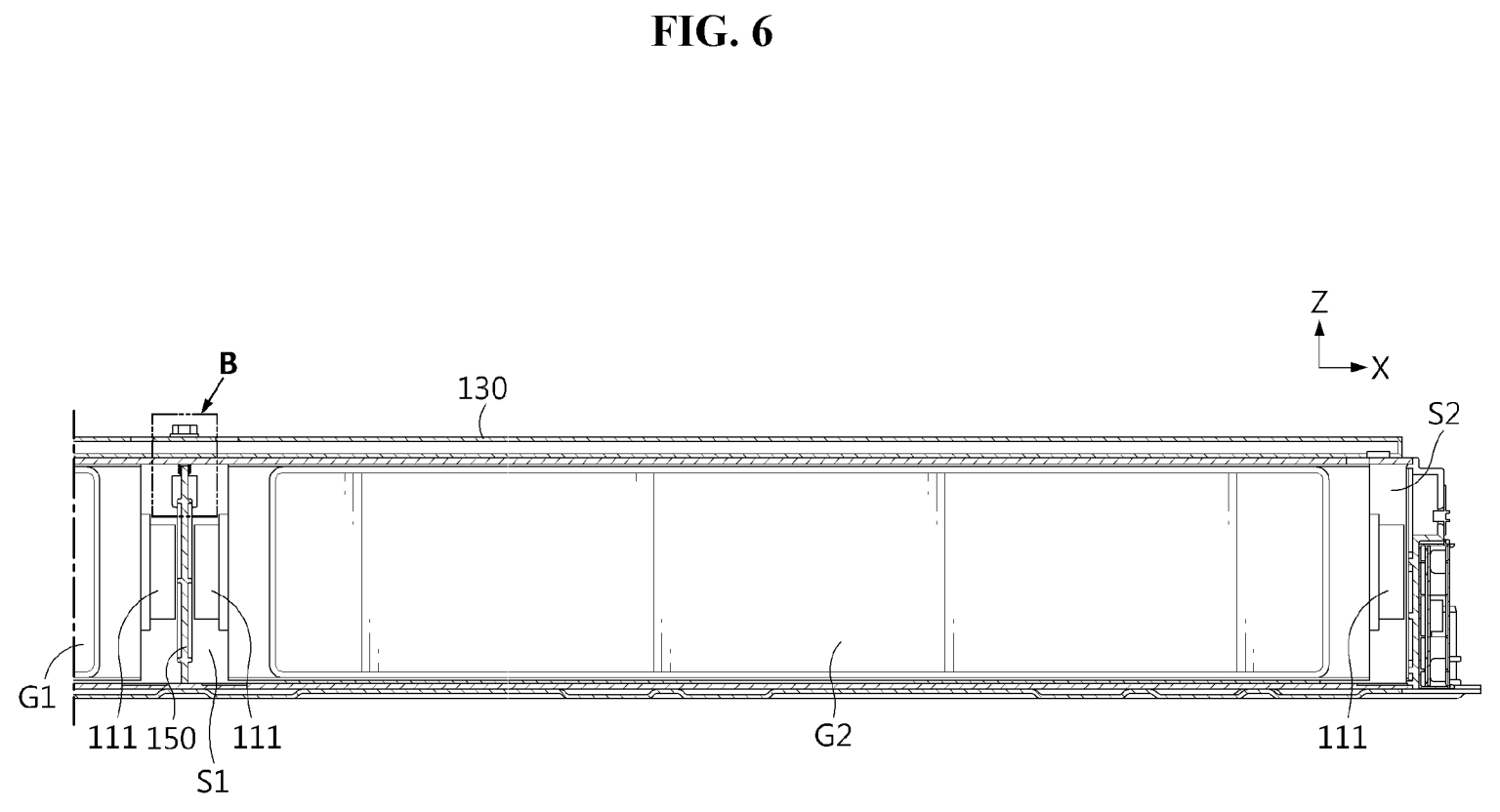

FIG. 6 is a partial vertical cross-sectional view schematically showing the internal parts of the battery module according to an embodiment of the present disclosure.

Referring to FIG. 6 together with FIGS. 2 and 3, the battery module 100 of the present disclosure may include the plurality of battery cells 110 stacked in a direction (front-rear direction) to form the battery cell group G1. For example, the plurality of battery cells 110 may form at least two battery cell groups G1, G2. For example, as shown in FIG. 2, the battery module 100 of the present disclosure may include the battery cell groups G1, G2 arranged side by side in the left-right direction.

Additionally, the at least two battery cell groups G1, G2 may be arranged spaced apart from each other. For example, as shown in FIG. 2, the two battery cell groups G1, G2 may be arranged spaced a predetermined distance apart in the left-right direction. For example, the battery cell group G1 may include the electrode leads 111 of each of the plurality of battery cells 110 at each of the left end and the right end. Additionally, when gas is vented from the plurality of battery cells 110, there is a higher possibility that the gas will exit through at least one of the left side or the right side having the electrode leads 111 than the front side and the rear side.

Alternatively, in the battery cell groups G1, G2, when gas is vented from any of the battery cells 110, there is a high possibility that the gas will move toward the electrode leads 111. That is, the battery cell groups G1, G2 may be stacked with the plurality of battery cells 110 facing the region having no electrode lead 111 to allow gas to easily move to one side or the other side of the battery cell group G2 where the plurality of battery cells 110 is arranged less densely.

Furthermore, the exit port 123 may be on at least one side where the electrode leads 111 of the battery cell group G1 are disposed. That is, the exit port 123 may be disposed facing the space S1 between the at least two battery cell groups G1, G2. That is, the exit port 123 may be adjacent to a location having a relatively high probability that gas venting will occur in the battery cell group G1. For example, the battery cell group G1 may be configured to vent gas through the space S1 between the at least two battery cell groups G1, G2 when swelling or thermal runaway occurs.

For example, when the battery cell group G1 includes the pouch-type battery cell 110, the battery cell group G1 may be configured to vent gas through the space between the at least two battery cell groups G1, G2. For example, when the battery cell 110 is the pouch-type battery cell 110, the sealing part of the battery cell 110 facing the space S1 between the battery cell groups G1, G2 may have weaker sealing strength than other sealing part.

Additionally, the gas inlet 132 may be in communication with the exit port 123. That is, the gas inlet 132 may be disposed facing the space between the at least two battery cell groups G1, G2 to minimize the movement trajectory of the gas vented from one side of the battery cell group G1.

Accordingly, according to this configuration of the present disclosure, since the battery module 100 of the present disclosure includes the exit port 123 on at least one side where the electrode leads 111 of the battery cell group G1 are disposed, when gas from any of the plurality of battery cells 110 moves to at least one side of the battery cell group G1, it is possible to allow the gas to exit the module housing 120 at the shortest distance through the exit port 123 on one side of the battery cell group G1, thereby minimizing thermal runaway of the other battery cell 110 or explosion propagation caused by the movement of the high temperature gas to the other battery cells 110 in normal operation or the battery cell group G2.

Meanwhile, referring back to FIGS. 2 to 5, the gas venting member 130 of the battery module 100 according to an embodiment of the present disclosure may include at least two gas channels 131. For example, as shown in FIGS. 2 and

4, the first gas channel 131*a* may be configured to move the gas entering through the first gas inlet 132*a* to the first gas outlet 133*a* at the left end of the gas venting member 130. That is, the first gas channel 131*a* may have the passage (not shown) extended in the left direction to move the gas in the left direction from the center of the left-right direction of the gas venting member 130. The second gas channel 131*b* may be configured to move the gas entering through the second gas inlet 132*b* to the second gas outlet 133*b* at the right end of the gas venting member 130. That is, the second gas channel 131*b* may have the passage extended in the right direction to move the gas in the right direction from the center of the left-right direction of the gas venting member 130.

For example, as shown in FIG. 3, the third gas channel 131*c* may be configured to move the gas entering through the third gas inlet 132*c* to the third gas outlet 133*c* at the center of the left-right direction of the gas venting member 130. That is, the third gas channel 131*c* may have the passage extended in the right direction to move the gas from the left end of the gas venting member 130 to the center of the left-right direction. The fourth gas channel 131*d* may be configured to move the gas entering through the fourth gas inlet 132*d* to the fourth gas outlet 133*d* at the center of the left-right direction of the gas venting member 130. That is, the fourth gas channel 131*d* may have the passage extended in the left direction to move the gas from the right end of the gas venting member 130 to the center of the left-right direction.

Additionally, the at least two gas channels 131 of the present disclosure may be designed to allow the gas entering the gas channels 131 to move in different directions. The gas channel 131*a* on the front side and the gas channel 131*c* on the rear side with respect to the center of the front-rear direction of the gas venting member 130 may be set in opposite gas movement directions. For example, the gas movement direction of the first gas channel 131*a* may be the left direction, and the gas direction of the third gas channel 131*c* may be the right direction. Additionally, for example, the second gas channel 131*b* and the fourth gas channel 131*d* on the battery cell group G2 may have opposite gas movement directions. For example, the gas movement direction of the second gas channel 131*b* may be the right direction, and the gas direction of the fourth gas channel 131*d* may be the left direction.

Accordingly, according to this configuration of the present disclosure, since the present disclosure includes at least two gas channels 131, and the at least two gas channels 131 are designed to allow the gas entering the gas channels 131 to move in different directions, when gas is generated from the battery cell group G1, it is possible to set the gas movement path of the gas channels 131 of the gas venting member 130 as long as possible while minimizing the influence of the high temperature gas on the battery cell group G2. That is, when gas is generated from the battery cell group G1, the gas enters the adjacent gas inlet 132 and is allowed to move along the movement path that is as long as possible through the gas channels set in different gas movement directions, thereby dissipating the energy of the high temperature gas, spark and flame. The battery module 100 of the present disclosure may reduce or eliminate the scale of the high temperature gas, spark and flame vented from the battery module 100, thereby minimizing secondary damage caused by the vented gas, spark and flame.

Referring to FIG. 6 together with FIG. 2, at least one of the at least two exit ports 123 may be at the location facing the space S1 between the at least two battery cell groups G1, G2. The at least one other exit port 123 may be at the location facing the space S2 on one side of the battery cell group G1 facing away from the space S1 between the battery cell groups G1, G2. For example, as shown in FIG. 2, the first exit port 123*a* and the second exit port 123*b* may be at the location facing the space S1 between the two battery cell groups G1, G2. The third exit port 123*c* may be at the location facing the space (not shown) on the left side of the battery cell group G1 in the direction facing away from the space S1 between the battery cell groups G1, G2. Additionally, the fourth exit port 123*d* may be at the location facing the space S2 on the right side of the battery cell group G2 in the direction facing away from the space S1 between the battery cell groups G1, G2. That is, the electrode leads 111 may be disposed on the left or right side of the battery cell group G1, and the predetermined space for gas movement may be on the left or right side of the battery cell group G1 where the electrode leads 111 are disposed.

Meanwhile, referring back to FIGS. 2 to 4 and 6, at least one of the at least two gas channels 131 may be extended from the location corresponding to the space S1 between the at least two battery cell groups G1, G2 in the direction (outward) facing away from the space S1 between the battery cell groups G1, G2. The at least one other gas channel 131 may be extended from one side (outer side) facing away from the space S1 between the battery cell groups G1, G2 toward (inward) the space S1 between the battery cell groups G1, G2. For example, as shown in FIGS. 2, 3 and 6, the first gas channel 131*a* and the third gas channel 131*c* may be disposed on the battery cell group G1. The first gas channel 131*a* may be extended from the space S1 between the two battery cell groups G1, G2 in the direction (left direction) facing away from the space S1 between the battery cell groups G1, G2. The third gas channel 131*c* may be extended from one side (the left side) facing away from the space S1 between the battery cell groups G1, G2 toward the space S1 between the battery cell groups G1, G2.

For example, as shown in FIGS. 2, 3 and 6, the second gas channel 131*b* and the fourth gas channel 131*d* may be disposed on the battery cell group G2. The second gas channel 131*b* may be extended from the space S1 between the at least two battery cell groups G1, G2 in the direction (the right direction) facing away from the space S1 between the battery cell groups G1, G2. The fourth gas channel 131*d* may be extended from one side (the right side) facing away from the space S1 between the battery cell groups G1, G2 toward the space S1 between the battery cell groups G1, G2.

Accordingly, according to this configuration of the present disclosure, since the present disclosure includes at least one of the at least two gas channels 131 extended from the space S1 between the at least two battery cell groups G1, G2 in the direction facing away from the space S1 between the battery cell groups G1, G2 and the at least one other gas channel 131 extended from one side facing away from the space S1 between the battery cell groups G1, G2 toward the space S1 between the battery cell groups G1, G2, when gas is generated from the battery cell group G1, it is possible to set the gas movement path of the gas channels of the gas venting member 130 as long as possible while minimizing the influence of the high temperature gas on the battery cell group G2. That is, when gas is generated from the battery cell group G1, the gas enters the adjacent gas inlet 132 and is allowed to move to the space S1 between the battery cell groups G1, G2, or on the contrary, to move in the direction (outward) facing away from the space S1 between the battery cell groups G1, G2, thereby allowing the high temperature gas, spark and flame to move along the movement path that is as long as possible through the gas channels. Accordingly, the present disclosure may dissipate the energy of the generated high temperature gas, spark and flame while moving along the gas channels, thereby reducing or eliminating the scale of the high temperature gas, spark and flame vented from the battery module 100. Ultimately, the battery module 100 of the present disclosure may minimize secondary damage caused by high temperature gas, spark and flame generated due to abnormal behaviors of the plurality of battery cells 110.

Referring to FIG. 2, the gas venting member 130 of the present disclosure may include at least two gas outlets 133. One of the at least two gas outlets 133 may be at the end of the gas venting member 130 in the direction facing away from the space S1 between the at least two battery cell groups G1, G2. The other gas outlet 133 may be at the center of the gas venting member 130 facing the space S1 between the at least two battery cell groups G1, G2.

For example, as shown in FIGS. 2 and 6, the gas venting member 130 may include the first gas outlet 133*a*, the second gas outlet 133*b*, the third gas outlet 133*c* and the fourth gas outlet 133*d*. The first gas outlet 133*a* and the second gas outlet 133*b* may be at the two ends of the gas venting member 130 in the direction (the left-right direction) facing away from the space S1 between the battery cell groups G1, G2. The third gas outlet 133*c* and the fourth gas outlet 133*d* may be at the location facing the space S1 between the two battery cell groups G1, G2.

Accordingly, according to this configuration of the present disclosure, since one of the at least two gas outlets 133 is at the end of the gas venting member 130 in the direction facing away from the space S1 between the at least two battery cell groups G1, G2 and the other gas outlet 133 is at the location facing the space S1 between the at least two battery cell groups G1, G2, it is possible to set the gas movement path of the gas channels 131 of the gas venting member 130 as long as possible while minimizing the influence of the high temperature gas on the battery cell group G2 when gas is generated from the battery cell group G1.

That is, when gas is generated from the battery cell group G1, the gas may enter the gas inlet 132 at the location facing the space S1 between the battery cell groups G1, G2, pass through the gas channel 131 and exit the gas outlet 133 on one side in the direction facing away from the space S1 between the battery cell groups G1, G2. On the contrary, when gas enters the gas inlet 132 at the location facing away from the space S1 between the battery cell groups G1, G2, the gas may move to the space S1 between the battery cell groups G1, G2 through the gas channel 131 and exit through the gas outlet 133 disposed facing the space S1 between the battery cell groups G1, G2.

Ultimately, the battery module 100 of the present disclosure may allow the generated high temperature gas, spark and flame to move along the movement path that is as long as possible through the gas channels 131 of the gas venting member 130. Accordingly, it is possible to dissipate the energy of the generated high temperature gas, spark and flame through the gas venting member 130, thereby reducing or eliminating the scale of the high temperature gas, spark and flame vented from the battery module 100. Ultimately, the battery module 100 of the present disclosure may minimize secondary damage caused by the high temperature gas, spark and flame generated due to abnormal behaviors of the plurality of battery cells 110.

Figure 7:
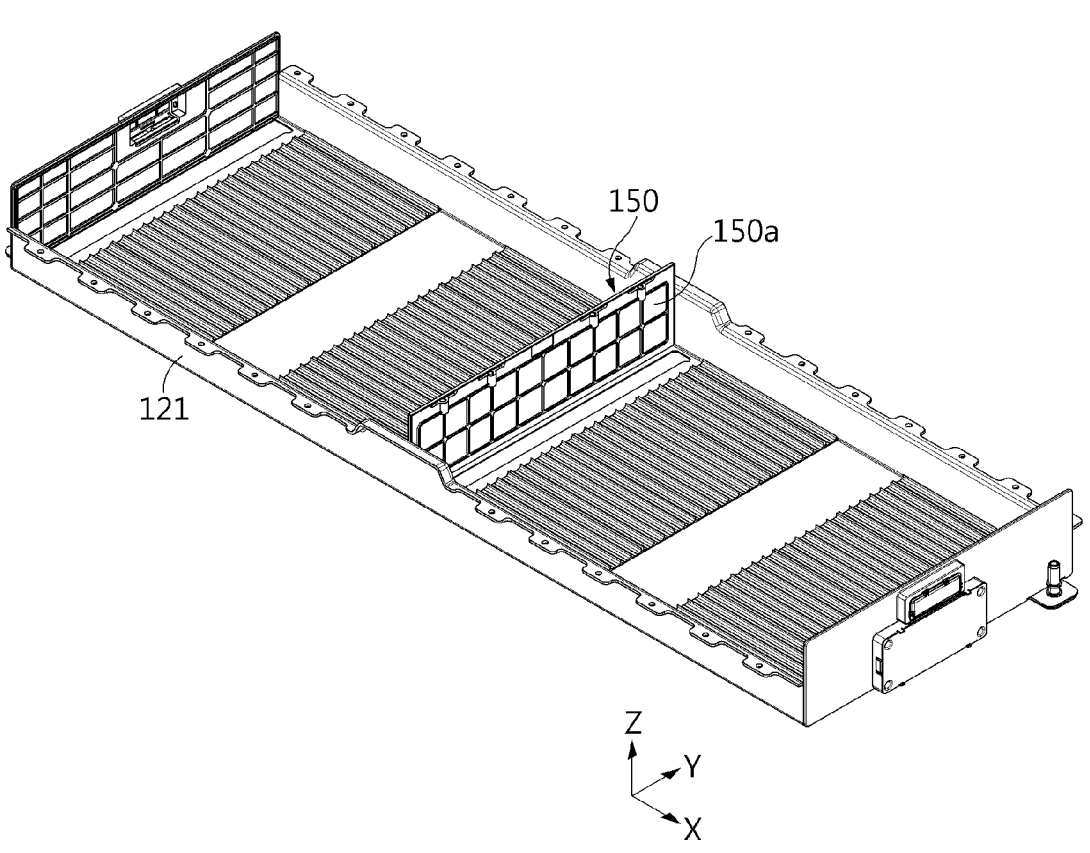
FIG. 7 is a perspective view schematically showing the internal parts of a module housing of a battery module according to an embodiment of the present disclosure.

FIG. 7 is a perspective view schematically showing the internal parts of the module housing of the battery module according to an embodiment of the present disclosure. Additionally, FIG. 8 is a schematic partial enlarged view of section B in FIG. 6.

Figure 8:
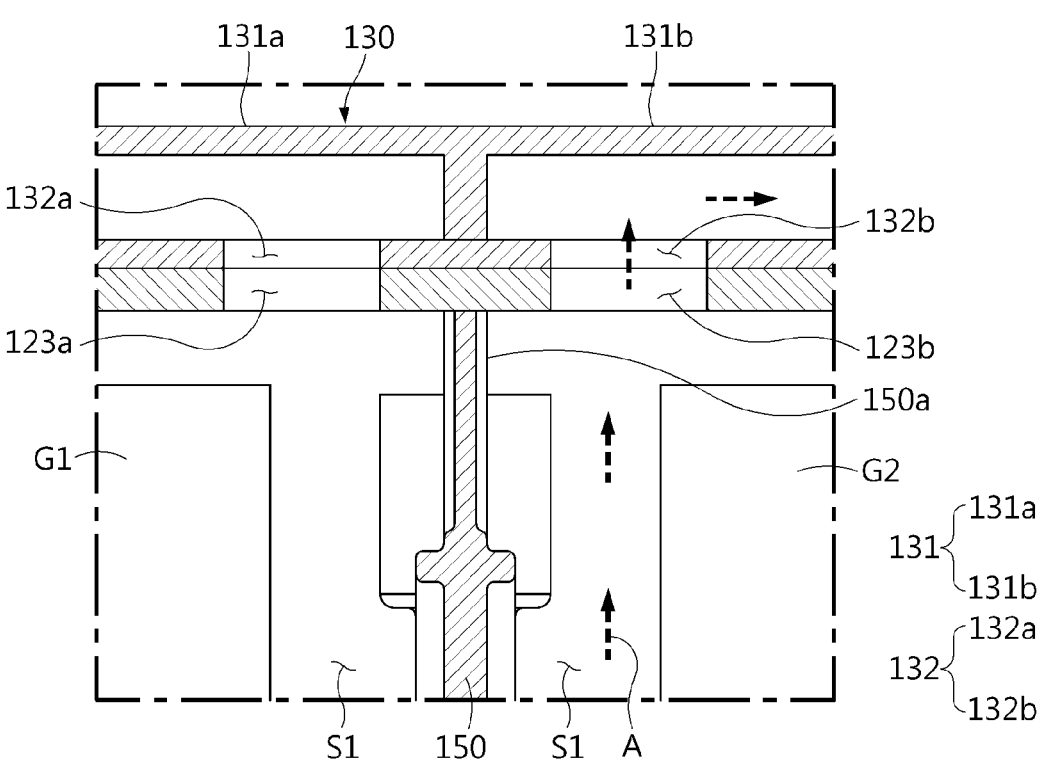
FIG. 8 is a schematic partial enlarged view of section B in FIG. 6.

Referring to FIGS. 7 and 8 together with FIGS. 2 and 6, the battery module 100 according to an embodiment of the present disclosure may further include a reinforcement beam 150. The reinforcement beam 150 may be mounted in the internal space of the module housing 120. The reinforcement beam 150 may be disposed between the at least two battery cell groups G1, G2. For example, as shown in FIG. 7, the reinforcement beam 150 may be disposed at the center of the internal space of the module housing 120. Additionally, the reinforcement beam 150 may be positioned in the gap between the battery cell groups G1, G2 arranged in the left-right direction.

Additionally, the reinforcement beam 150 may be configured to guide the movement of the gas vented from the plurality of battery cells 110 to the exit port 123. The reinforcement beam 150 may include a partition 150a configured to guide the movement of the gas vented from the plurality of battery cells 110 to the exit port 123 and separate the at least two battery cell groups G1, G2. For example, as shown in FIG. 7, the reinforcement beam 150 may include the partition 150a extended up toward the exit port 123. The bottom of the reinforcement beam 150 may be coupled to the lower housing 121.

Furthermore, the partition 150a may divide the accommodation space for mounting the at least two battery cell groups G1, G2 into two spaces. The partition 150a may be configured to block the movement of high temperature gas vented from any one (G2) of the at least two battery cell groups G1, G2 to the other battery cell group (G1).

Accordingly, according to this configuration of the present disclosure, since the present disclosure further includes the reinforcement beam 150 including the partition 150a configured to guide the movement of the gas vented from the plurality of battery cells 110 to the exit port 123 and separate the at least two battery cell groups G1, G2, it is possible to guide the movement of the high temperature gas generated from the at least two battery cell groups G1, G2 to the exit port 123. Furthermore, the partition 150a of the reinforcement beam 150 may block the movement of the high temperature gas A vented from any one (G2) of the at least two battery cell groups G1, G2 to the other battery cell group (G1), thereby preventing the spread of thermal runaway or gas explosion to the other battery cell group (G1).

Figure 9:
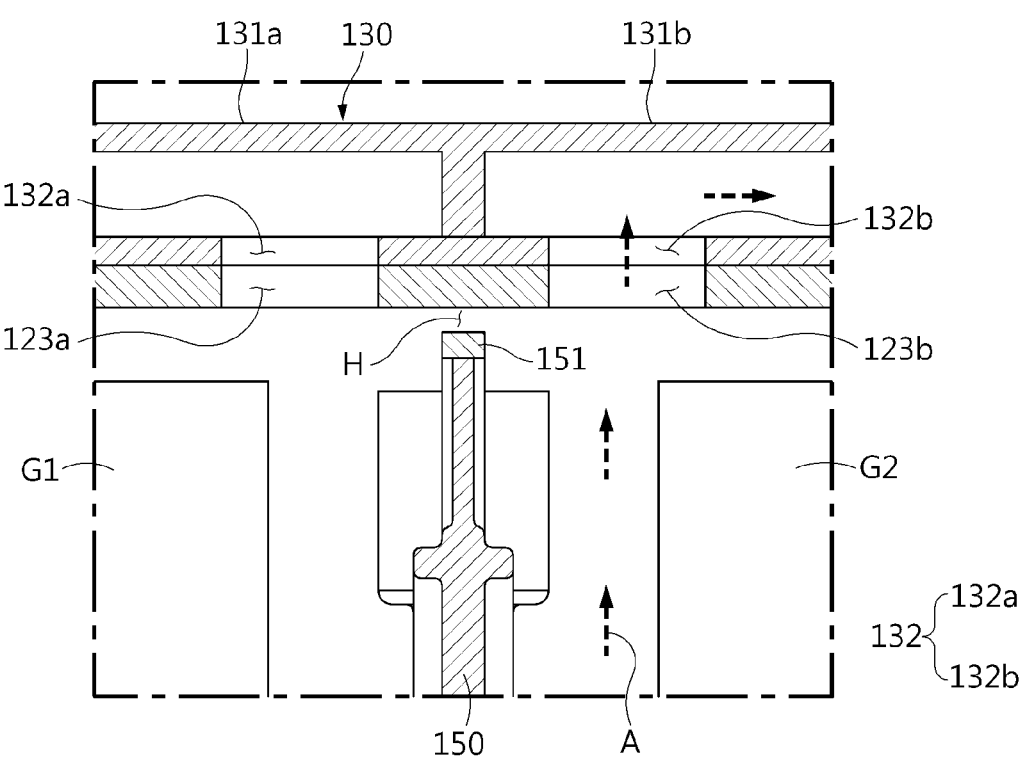
FIGS. 9 and 10 are partial vertical cross-sectional views schematically showing the internal parts of a battery module according to another embodiment of the present disclosure.
Figure 10:
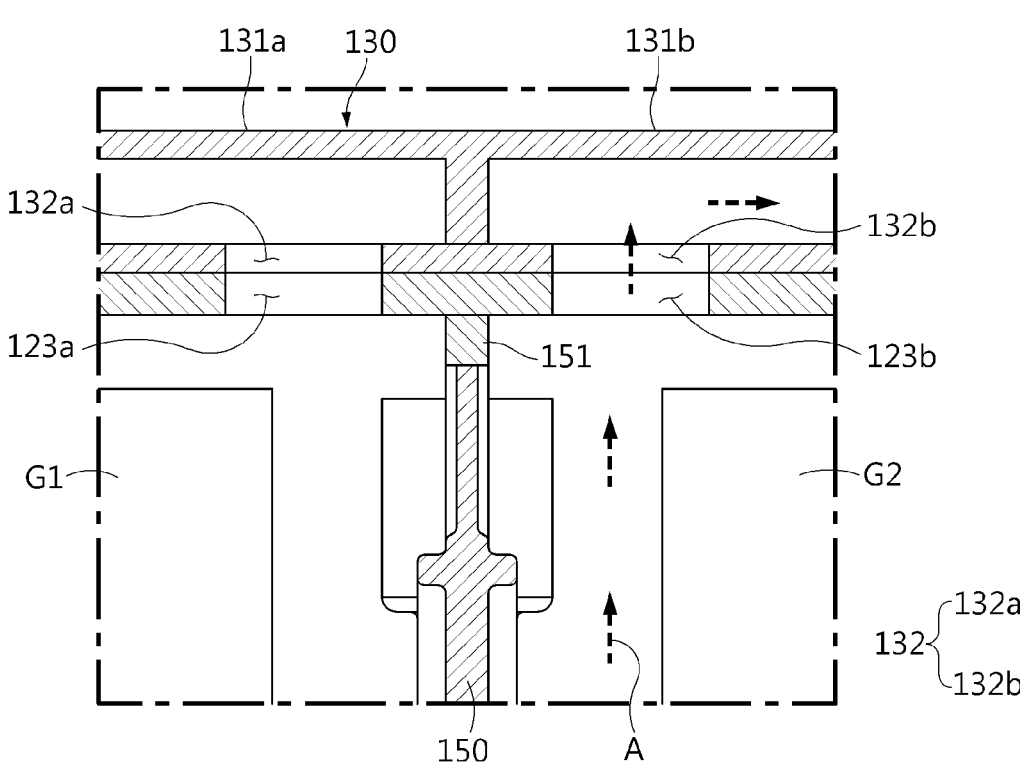

FIGS. 9 and 10 are partial vertical cross-sectional views schematically showing the internal parts of a battery module according to another embodiment of the present disclosure.

Referring to FIGS. 9 and 10, when compared with the reinforcement beam 150 of FIG. 8, the reinforcement beam 150 of the battery module 100 according to another embodiment of the present disclosure includes a through-hole H configured to allow air to move, and may further include an opening/closing member 151. The remaining components may be identical to the components of the battery module 100 shown in FIG. 1.

Specifically, the reinforcement beam 150 of FIG. 9 may have the through-hole H configured to allow air to move to the at least two battery cell groups G1, G2. The through-hole H may be an open portion of the reinforcement beam 150. Alternatively, as shown in FIG. 9, the through-hole H may have a groove shape formed by the downward insertion of the top of the reinforcement beam 150.

Additionally, the reinforcement beam 150 may further include the opening/closing member 151 configured to close the through-hole H when gas is vented from the plurality of battery cells 110 as shown in FIG. 10. The opening/closing member 151 may be a thermal expansion material whose volume expands when the temperature rises above a predetermined temperature. The thermal expansion material of the opening/closing member 151 may be, for example, Saint-Gobain FS1000. Alternatively, the thermal expansion material may include graphite flake whose volume expands at the predetermined temperature. The opening/closing member 151 may be in the through-hole H. The opening/closing member 151 may be configured to close the through-hole H as the temperature of the thermal expansion material increases when high temperature gas is vented from the battery cell 110.

Accordingly, according to this configuration of the present disclosure, since the present disclosure includes the reinforcement beam 150 having the through-hole H configured to allow air to move to the at least two battery cell groups G1, G2, and further including the opening/closing member 151 configured to close the through-hole H when gas is vented from the plurality of battery cells 110, it is possible to allow air to smoothly move between the at least two battery cell groups G1, G2 during the normal operation of the battery module 100, thereby achieving thermal balance between the at least two battery cell groups G1, G2. Additionally, when gas explosion occurs in any one of the at least two battery cell groups G1, G2, the through-hole H of the reinforcement beam 150 may be closed by the opening/closing member 151, so it is possible to prevent the movement of the high temperature gas to the battery cell group G1 in normal operation on the opposite side. Accordingly, the present disclosure may prevent gas explosion of any of the battery cells 110 from spreading to secondary gas explosion of the battery cell group G1, thereby minimizing damage.

Figure 11:
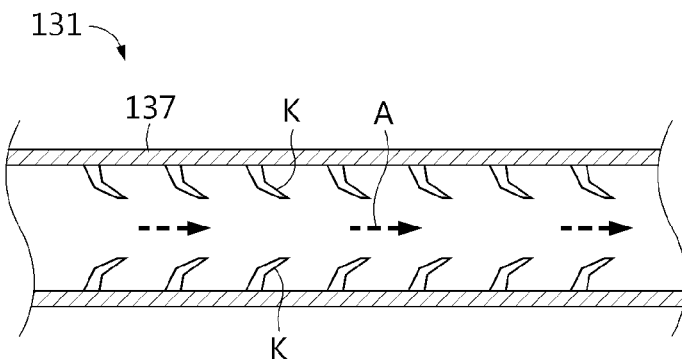
FIG. 11 is a partial vertical cross-sectional view schematically showing the internal parts of a gas channel of a battery module according to still another embodiment of the present disclosure.

FIG. 11 is a partial vertical cross-sectional view schematically showing the internal parts of a gas channel of a battery module according to still another embodiment of the present disclosure.

Referring to FIG. 11 together with FIG. 8, the gas channel 131 may have a plurality of protrusions K arranged at a predetermined interval to cause interference with high temperature gas, spark and flame. The plurality of protrusions K may protrude in the inward direction from the inner surface of the narrow passage 137. Additionally, the plurality of protrusions K may be inclined in the movement direction of the gas A. That is, the plurality of protrusions K may reduce the movement speed of the gas A while allowing the gas A to move in the intended movement direction. Furthermore, the plurality of protrusions K may prevent the gas from moving in the reverse direction (contrary to the intended direction) and flowing back into the module housing 120.

Accordingly, according to this configuration of the present disclosure, since the battery module 100 of the present disclosure has the plurality of protrusions K arranged at the predetermined interval to cause interference with the gas A moving in the gas channels 131 of the gas venting member 130, it is possible to effectively reduce the movement speed of the gas A moving in the gas channel 131 and the gas pressure. Furthermore, the plurality of protrusions K may prevent the movement (backflow) of the gas A in the reverse direction, not the intended movement direction of the gas A in the gas channels 131, thereby preventing the gas A moving in the gas channels 131 from flowing back into the module housing 120. Accordingly, the battery module 100 of the present disclosure may prevent the temperature rise of the plurality of battery cells 110 caused by the backflow of the high temperature gas A into the module housing 120.

Figure 12:
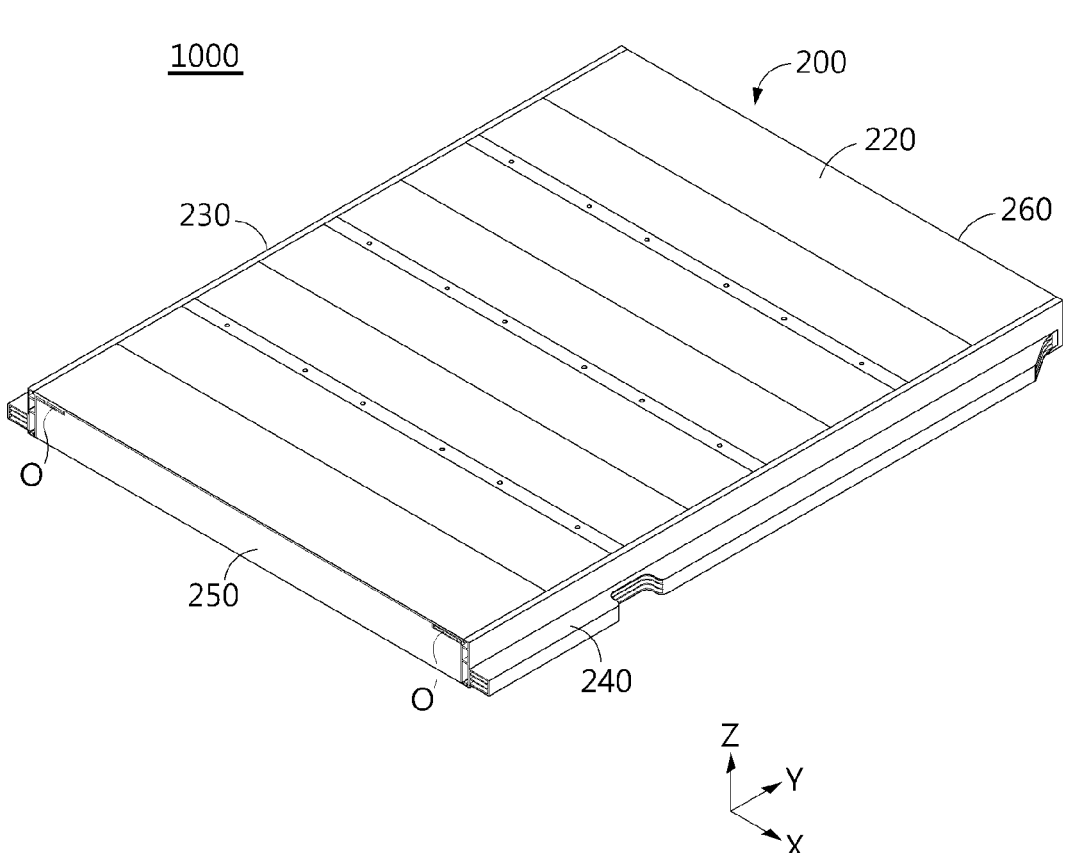
FIG. 12 is a perspective view schematically showing the parts of a battery pack according to an embodiment of the present disclosure.

FIG. 12 is a perspective view schematically showing the parts of a battery pack according to an embodiment of the present disclosure.

Referring to FIG. 12 together with FIG. 1, the battery pack 1000 according to another embodiment of the present disclosure may include at least one battery module 100 and a pack case 200 accommodating the plurality of battery modules 100. The pack case 200 is a component used to accommodate the battery modules 100, and may include a left side frame 230, a right side frame 240, a base plate 210 coupled to the bottom of each of the left side frame 230 and the right side frame 240, a top plate 220 coupled to the top of each of the left side frame 230 and the right side frame 240, a front cover 250 that forms a front wall of the pack case 200 and a rear cover 260 that forms a rear wall.

Additionally, although not shown, for example, the plurality of battery modules 100 may be arranged in the front-rear direction. Additionally, the battery pack 1000 may have, on the front side, an outlet port O in communication with the gas outlet 133 of the gas venting member 130 of the battery module 100. For example, the gas venting member 130 may be in communication with a gas exit channel (not shown) in each of the left side frame 230 and the right side frame 240. Additionally, the end of the gas exit channel may be connected to the outlet port O. For example, the gas exit channel may be a gas passage extended along the extension direction of the left side frame 230.

Figure 13:
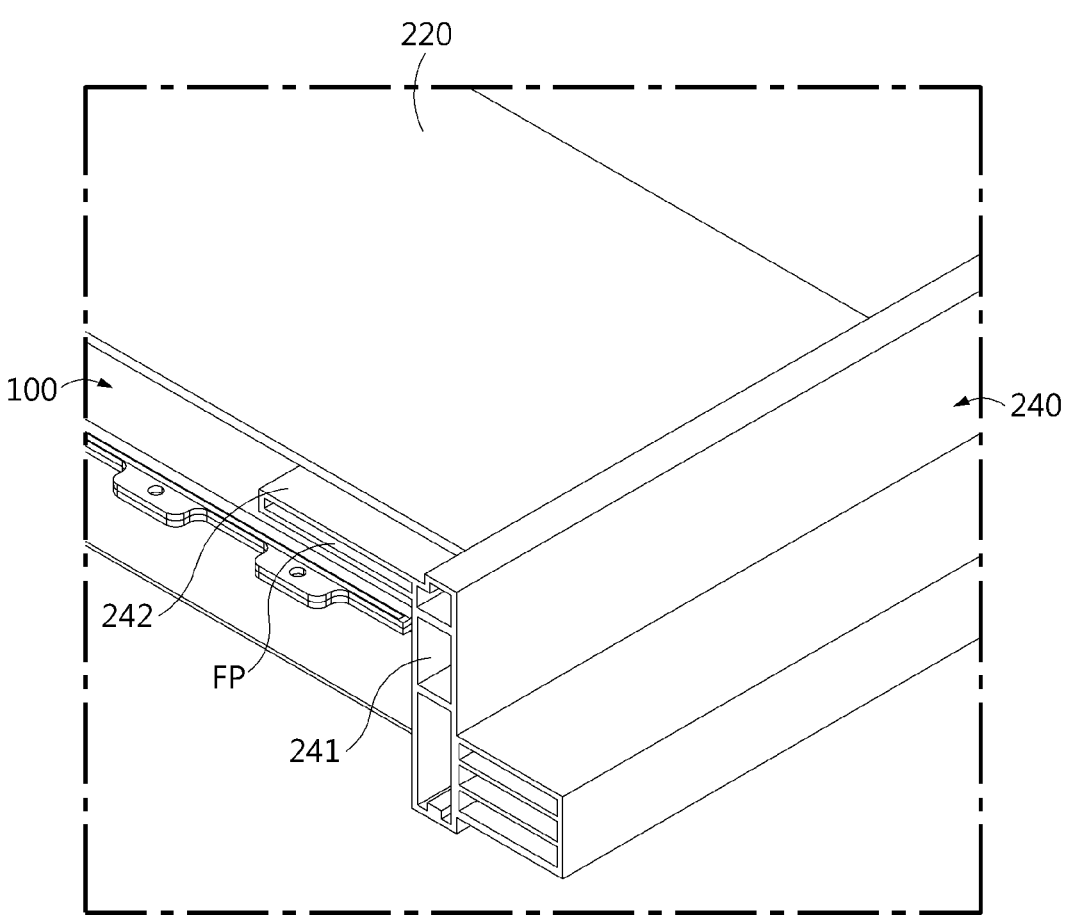
FIG. 13 is an exploded perspective view schematically showing a portion of battery module and a portion of side frame of a battery pack according to an embodiment of the present disclosure.

FIG. 13 is an exploded perspective view schematically showing a portion of the battery module and a portion of the side frame of the battery pack according to an embodiment of the present disclosure. Additionally, FIG. 14 is a partial cross-sectional view schematically showing the internal parts of the battery pack according to an embodiment of the present disclosure.

Figure 14:
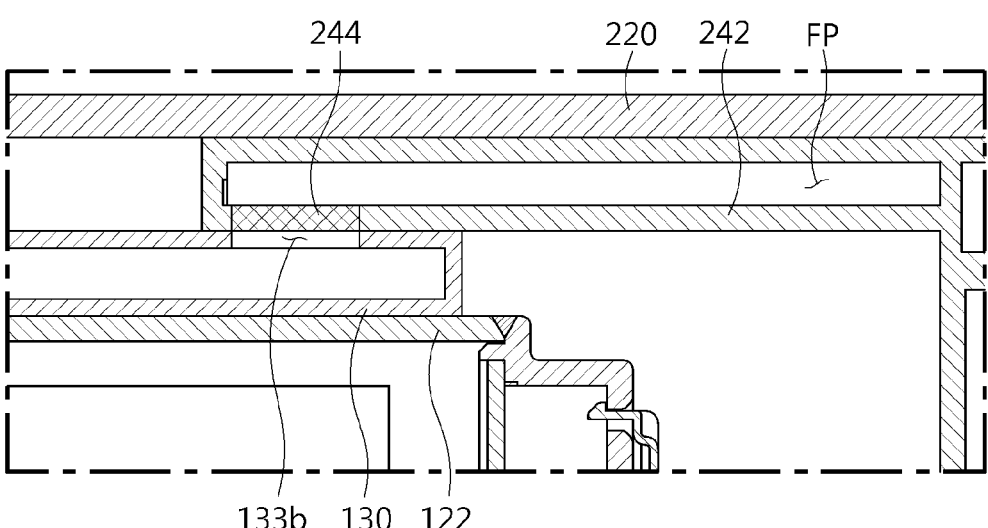
FIG. 14 is a partial cross-sectional view schematically showing the internal parts of a battery pack according to an embodiment of the present disclosure.

Referring to FIGS. 13 and 14 together with FIG. 1, the right side frame 240 may include a vertical frame 241 extended in the heightwise direction of the battery module 100 and a module connection frame 242 extended in the horizontal direction (left direction) from the vertical frame 241 and connected to the gas venting member 130. The module connection frame 242 has a hollow structure with a gas movement passage FP inside.

Additionally, when the battery pack 1000 includes the plurality of battery modules 100, the module connection frame 242 may include a plurality of inlet ports 244 arranged at a predetermined interval along the lengthwise direction (Y axis direction) and one outlet port O at one end of the front cover 250 side. For example, as shown in FIG. 14, each inlet port 244 may be disposed in contact with the gas outlet 133*b* of the gas venting member 130 of each battery module 100. A gasket may be applied to the contact interface between each inlet port 244 and the gas outlet 133*b* for sealing and anti-slip. Additionally, a metal mesh may be applied to each inlet port 244 to prevent the leakage of high temperature spark or flame.

Furthermore, the module connection frame 242 of the right side frame 240 of this embodiment is positioned on the gas venting member 130. In other words, the module connection frame 242 is in communication with the gas venting member 130 with one end placed on the right edge of the upper surface of the gas channel 131 and the inlet port 244 vertically matching the second gas outlet 133*b*.

That is, the gas generated from the battery cell group G2 may enter the gas venting member 130 through the second exit port (123*b* in FIG. 2), horizontally move in the right direction along the gas channel 131*b*, move up from the second gas outlet 133*b* and enter the right side frame 240 through the inlet port 244 of the right side frame 240. Additionally, the moved gas may move to the front cover 250 of the pack case 200 along the gas movement passage FP of the right side frame 240, and may exit the pack case 200 through the outlet port O of the module connection frame 242.

Accordingly, in the case of high temperature spark or flame generated from the battery cell group G2, the present disclosure may change the direction of the movement path by the vertical connection structure between the second exit port 123*b* and the second gas inlet 132*b*, dissipate the spark or flame by the plurality of narrow passage structures in the gas channels 131, and change the movement direction of the spark or flame by the vertical connection structure between the second gas outlet 133*b* and the inlet port 244. Accordingly, it is possible to make the high temperature spark or flame fade through many movement direction changes and dissipation of the high temperature spark or flame, thereby preventing the spark and flame from moving out of the pack case 200. Ultimately, the battery pack 1000 of the present disclosure may significantly reduce the fire risks outside of the battery pack 1000.

Additionally, although not shown, in the same way as the right side frame 240, the left side frame 230 may have an inlet port in communication with the first gas outlet 133*a* of the gas venting member 130. The left side frame 230 may include a vertical frame extended in the heightwise direction of the battery module 100 and a module connection frame extended in the horizontal direction (right direction) from the vertical frame and connected to the gas venting member 130. The module connection frame has a hollow structure with a gas movement passage inside. Additionally, the module connection frame 242 has one outlet port O at one end of the front cover 250 side. The inlet port of the left side frame 230 may be disposed in contact with the gas outlet 133 of the gas venting member 130 of each battery module 100.

Figure 15:
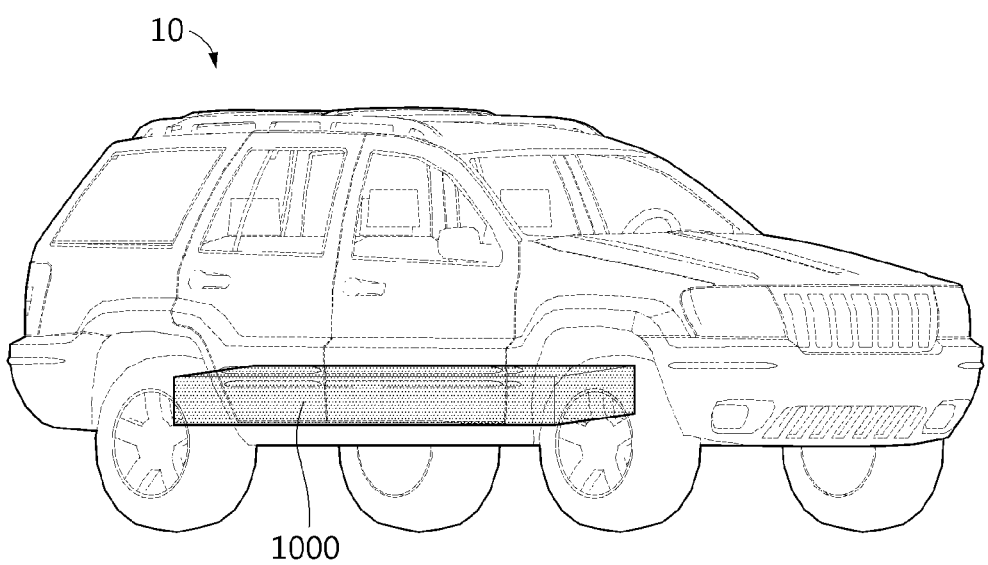
FIG. 15 is a perspective view schematically showing a vehicle according to an embodiment of the present disclosure.

FIG. 15 is a perspective view schematically showing a vehicle according to an embodiment of the present disclosure.

Referring to FIG. 15 together with FIG. 1, the vehicle 10 according to an embodiment of the present disclosure may include at least one battery module (not shown). The vehicle may include, for example, a vehicle body having an accommodation space in which the battery pack 1000 including the at least one battery module is received. For example, the vehicle may be an electric vehicle, an electric scooter, an electric wheelchair or an electric bike.

Meanwhile, the terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the scope of the appended claims and equivalents thereof.

What is claimed is:
1. A battery module, comprising:
   a plurality of battery cells, each battery cell of the plurality of battery cells having an electrode lead on at least one side;

a module housing having an accommodation space in which the plurality of battery cells is received, the module housing including at least one exit port, each exit port located to correspond to respective electrode leads of the plurality of battery cells, each exit port being located vertically above the respective electrode leads and configured to vent gas from the plurality of battery cells; and a gas venting member configured to cover at least one side of the module housing, the gas venting member having at least one gas channel along which the gas coming out of the at least one exit port moves.

2. The battery module according to claim 1, wherein the plurality of battery cells is stacked in a first direction to form at least one battery cell group, and wherein the gas venting member includes:

a gas inlet through which the gas coming out of the at least one exit port enters; and a gas outlet in communication with the gas channel and formed at an end of a movement direction of the gas in the gas channel, the gas outlet being open to allow the gas out, wherein the at least one gas channel has a plurality of passages along which the gas entering the gas inlet moves, and wherein each exit port is located on a side of the module housing where the electrode leads of the at least one battery cell group are disposed.

3. The battery module according to claim 2, wherein the at least one gas channel includes a first gas channel and a second gas channel, and wherein the first gas channel is configured to allow the gas entering the first gas channel to flow in a different direction than the gas entering the second gas channel.

4. The battery module according to claim 3, wherein the at least one battery cell group comprises a first cell group and a second cell group with a first space between the first cell group and the second cell group, and wherein the first gas channel extends from the first space in a direction away from the first space, and the second gas channel extends from a side spaced from the first space toward the first space.

5. The battery module according to claim 4, wherein the gas venting member includes at least two gas outlets, and wherein a first gas outlet of the at least two gas outlets is at the side spaced from the first space, and a second gas outlet of the at least two gas outlets is at the first space.

6. The battery module according to claim 2, wherein the at least one battery cell group comprises a first cell group and a second cell group with a first space between the first cell group and the second cell group, and wherein a reinforcement beam is mounted in an internal space of the module housing and disposed between the first cell group and the second cell group, the reinforcement beam including a partition configured to guide the movement of the gas vented from the plurality of battery cells to the exit port and separate the first cell group and the second cell group.

7. The battery module according to claim 6, wherein the reinforcement beam has a through-hole to allow air to move between the first cell group and the second cell group, and wherein the reinforcement beam further includes an opening/closing member configured to close the through-hole when the gas is vented from the plurality of battery cells.

8. The battery module according to claim 2, wherein the at least one gas channel has a plurality of protrusions arranged at a predetermined interval to cause interference with the gas moving in the at least one gas channel.

9. A battery pack comprising at least one battery module according to claim 1.

10. A vehicle comprising at least one battery module according to claim 1.

11. The battery module according to claim 1, wherein the plurality of battery cells form a first cell group and a second cell group, each of the first cell group and the second cell group having a first side and second side, and wherein the at least one exit port of the module housing comprises a first exit port at the first side and a second exit port at second side of each of the first cell group and the second cell group.

12. The battery module according to claim 11, wherein the gas venting member has an inlet aligned with each of the first exit port and the second exit port of the module housing and an outlet spaced from each inlet.

13. The battery module according to claim 1, wherein the plurality of battery cells has a first side and a second side spaced from the first side in a first direction, wherein the at least one exit port of the module housing comprises a first exit port at the first side of the plurality of battery cells and a second exit port at the first side of the plurality of battery cells, and wherein the gas venting member comprises:

a first gas inlet aligned with the first exit port;

a first gas outlet spaced from the first gas inlet in the first direction;

a first gas passage extending from the first gas inlet to the first gas outlet;

a second gas inlet aligned with the second exit port;

a second gas outlet spaced from the second gas inlet in the first direction;

a second gas passage extending from the second gas inlet to the second gas outlet.

* * * * *